(12) United States Patent
De Nardis

(10) Patent No.: US 10,816,140 B2
(45) Date of Patent: Oct. 27, 2020

(54) METHOD OF AN APPARATUS FOR TREATING BOIL-OFF GAS FOR THE PURPOSE OF SUPPLYING AT LEAST AN ENGINE

(71) Applicant: CRYOSTAR SAS, Hesingue (FR)

(72) Inventor: David De Nardis, Beijing (CN)

(73) Assignee: CRYOSTAR SAS, Hesingue (FR)

( * ) Notice: Subject to any disclaimer, the term of this patent is extended or adjusted under 35 U.S.C. 154(b) by 123 days.

(21) Appl. No.: 15/768,220

(22) PCT Filed: Oct. 16, 2015

(86) PCT No.: PCT/CN2015/092069
§ 371 (c)(1),
(2) Date: Apr. 13, 2018

(87) PCT Pub. No.: WO2017/063182
PCT Pub. Date: Apr. 20, 2017

(65) Prior Publication Data
US 2018/0313497 A1  Nov. 1, 2018

(51) Int. Cl.
*F17C 7/04* (2006.01)
*B63H 21/38* (2006.01)
(Continued)

(52) U.S. Cl.
CPC .............. *F17C 7/04* (2013.01); *B63H 21/38* (2013.01); *F17C 7/00* (2013.01); *F17C 9/02* (2013.01);
(Continued)

(58) Field of Classification Search
CPC .......... F17C 7/00; F17C 9/02; F17C 2203/03; F17C 2205/0146; F17C 2221/033;
(Continued)

(56) References Cited

U.S. PATENT DOCUMENTS 5,832,745 A * 11/1998 Klein Nagelvoort .. F25J 1/0022
62/619
8,656,726 B2 * 2/2014 Pozivil ..................... F17C 5/06
62/200
(Continued)

FOREIGN PATENT DOCUMENTS

CN          1446728 A       10/2003
CN          1707151 A       12/2005
KR       20150042405 A        4/2015

OTHER PUBLICATIONS

PCT International Search Report for PCT/CN2015/092069, dated Jun. 24, 2016, Authorized Officer: Yiwei Feng of S.I.P.O of the P.R. China, 5 pgs.
PCT Written Opinion of the International Searching Authority for PCT/CN2015/092069, dated Jun. 24, 2016, Authorized Officer: Yiwei Feng of S.I.P.O. of the P.R. China, 3 pgs.

*Primary Examiner* — Joel M Attey
(74) *Attorney, Agent, or Firm* — Millen White Zelano & Branigan, PC; Brion P. Heaney

(57) ABSTRACT

Apparatus for supplying natural gas fuel to an ocean-going tanker for the transport of liquefied natural gas (LNG), includes a first line with a compressor (12) having an inlet communicating with an ullage space (4) of at least one LNG storage tank (2) and an outlet communicating with a conduit leading from the compressor to at least one engine (38), and a second line with a forcing vaporiser (24) having an inlet communicating with a liquid storage region (6) of the tank (2), the second line being connected to the first line downstream of the compressor (12) and upstream of the at least one engine (38).

13 Claims, 3 Drawing Sheets

(51) Int. Cl.
*F17C 9/02* (2006.01)
*F17C 7/00* (2006.01)

(52) U.S. Cl.
CPC .. *F17C 2203/03* (2013.01); *F17C 2205/0146* (2013.01); *F17C 2221/033* (2013.01); *F17C 2223/0161* (2013.01); *F17C 2223/033* (2013.01); *F17C 2227/0135* (2013.01); *F17C 2227/0178* (2013.01); *F17C 2265/03* (2013.01); *F17C 2265/037* (2013.01); *F17C 2265/066* (2013.01); *F17C 2270/0105* (2013.01)

(58) Field of Classification Search
CPC ........ F17C 2223/0161; F17C 2223/033; F17C 2227/0135; F17C 2227/0178; F17C 2265/03; F17C 2265/037; F17C 2265/066; F17C 2270/0105

USPC .......................................................... 62/502
See application file for complete search history.

(56) References Cited

U.S. PATENT DOCUMENTS

| | | | |
|---|---|---|---|
| 2003/0054307 A1 | 3/2003 | Gerstendorfer et al. | |
| 2008/0008602 A1* | 1/2008 | Pozivil | F04D 29/5833 417/243 |
| 2010/0089072 A1 | 4/2010 | Lee et al. | |
| 2011/0185748 A1* | 8/2011 | Fuchs | F17C 9/04 62/50.2 |
| 2014/0290279 A1* | 10/2014 | Lee | B63B 25/16 62/48.2 |
| 2015/0330574 A1* | 11/2015 | Fuchs | F17C 13/00 62/48.2 |
| 2016/0114876 A1* | 4/2016 | Lee | F02C 3/22 60/39.465 |

* cited by examiner

METHOD OF AN APPARATUS FOR TREATING BOIL-OFF GAS FOR THE PURPOSE OF SUPPLYING AT LEAST AN ENGINE

This invention relates to a method of an apparatus for treating boil-off gas for the purposes of supplying at least an engine, e.g. a dual fuel Diesel engine. The method and apparatus according to the invention are particularly suitable for use on board ship for the purpose of providing fuel to the ship's engines.

The invention concerns more specifically the treatment of liquefied natural gas (LNG) on board of tankers that transport LNG. The transported LNG is conventionally used for the propulsion of the tanker. Gas from the tanks on board of the tanker supplies engines that propel the tanker.

Recently, new propulsion systems with a better efficiency than steam turbine propulsion were introduced. Accordingly, some vessels in the LNG carrier fleet utilise 4-stroke Dual Fuel Diesel Electric (DFDE) or low pressure 2-stroke Dual Fuel Diesel propulsion systems. These vessels are powered by multiple dual fuel Diesel engines and the engines are fuelled by Natural Boil-Off (NBO), Forced Boil-Off (FBO) or heavy fuel oil (HFO). Each engine is able to run either on gas (NBO and/or FBO) or Diesel (HFO), and in some cases both simultaneously.

According to power requirements, one or more engines will be operated. Some may be operated on gas, while others run on HFO. The available NBO flow is dependent on the gas composition, the level in the cargo tanks, sea conditions and the voyage (laden/ballast).

Depending on the vessel operation philosophy, power exceeding that available from the NBO will be fuelled by FBO (if gas operation takes priority) or HFO (if Diesel operation takes priority). The available power in the NBO and FBO depends on the gas composition and therefore mass- and volume flows have to be considered when sizing the equipment.

These new propulsion systems have requirements concerning the supplying of gas and either the NBO than the FBO may have to be treated before they supply the propulsion systems. Conventionally, the NBO and FBO are compressed and temperature conditioned prior their use as fuel for the new engines.

The invention aims to provide an improved method and apparatus for the treatment of gas used for supplying engines such as dual fuel engines.

Another aim of the invention is to supply the engines with a gas having a high proportion of methane and a proportion as low as possible of heavy components (such as propane, butane . . . ).

According to the present invention, there is provided an apparatus for supplying natural gas fuel to an ocean-going tanker for the transport of liquefied natural gas (LNG), comprising a first line with a compressor having an inlet communicating with the ullage space of at least one LNG storage tank and an outlet communicating with a conduit leading from the compressor to at least one engine, and a second line with a forcing vaporiser having an inlet communicating with a liquid storage region of the said tank, characterised in that the second line is connected to the first line downstream the compressor and upstream the engine.

In this way, the compressor can be sized for compressing only the gas in the first line. A part of the gas supplied to the engine(s) can be forced boil-off gas. It allows reducing the power of the apparatus since less power is needed for supplying gas to the engine(s) from forced boil-off gas than from compressed natural boil-off gas.

In an apparatus according to the invention, the compressor is preferably a multistage compressor. For example, the compressor has six stages.

In an embodiment of an apparatus according to the invention, the first line can comprise at least two compressors in parallel.

The second line can also comprise a mist separator device downstream the forcing vaporiser and upstream the connection point to the first line. In this way, the heavier components such as ethane, propane, butane may be partly removed before gas will be sent to the engine(s).

In order to adapt the state of the gas coming out from the first line and from the second line before their connection, the first line comprises for example at least an after cooler after the compressor(s) and the second line comprises for example at least a heater.

The invention also concerns a method for treating natural gas coming from a liquefied natural gas tank for supplying at least an engine, characterised by following steps:

supplying a first line with natural boil-off gas,
compressing the natural boil-off gas,
supplying a second line with liquefied natural gas,
forcing vaporising of the liquefied natural gas,
mixing the compressed natural boil-off gas with the forced boil-off gas,
supplying at least an engine with the mixed gas.

This method is adapted for the case that the engine is a dual fuel Diesel engine.

The natural boil-off gas can be compressed in at least one multistage compressor.

In the first line, the compressed gas can be cooled down in an after cooler before being mixed to the forced boil-off gas.

In the second line, after vaporisation of the liquefied natural gas, liquid can be removed from the fluid by a mist separation device.

In a method according to the invention, the gas can also be temperature controlled in the second line after the vaporisation.

BRIEF DESCRIPTION OF THE DRAWINGS

The method and apparatus according to the invention will now be described by way of example with reference to the accompanying drawings in which.

Like elements in FIGS. 1 to 3 are indicated by the same reference numerals and the drawings are not to scale.

DETAILED DESCRIPTION OF THE INVENTION

Figure 1:
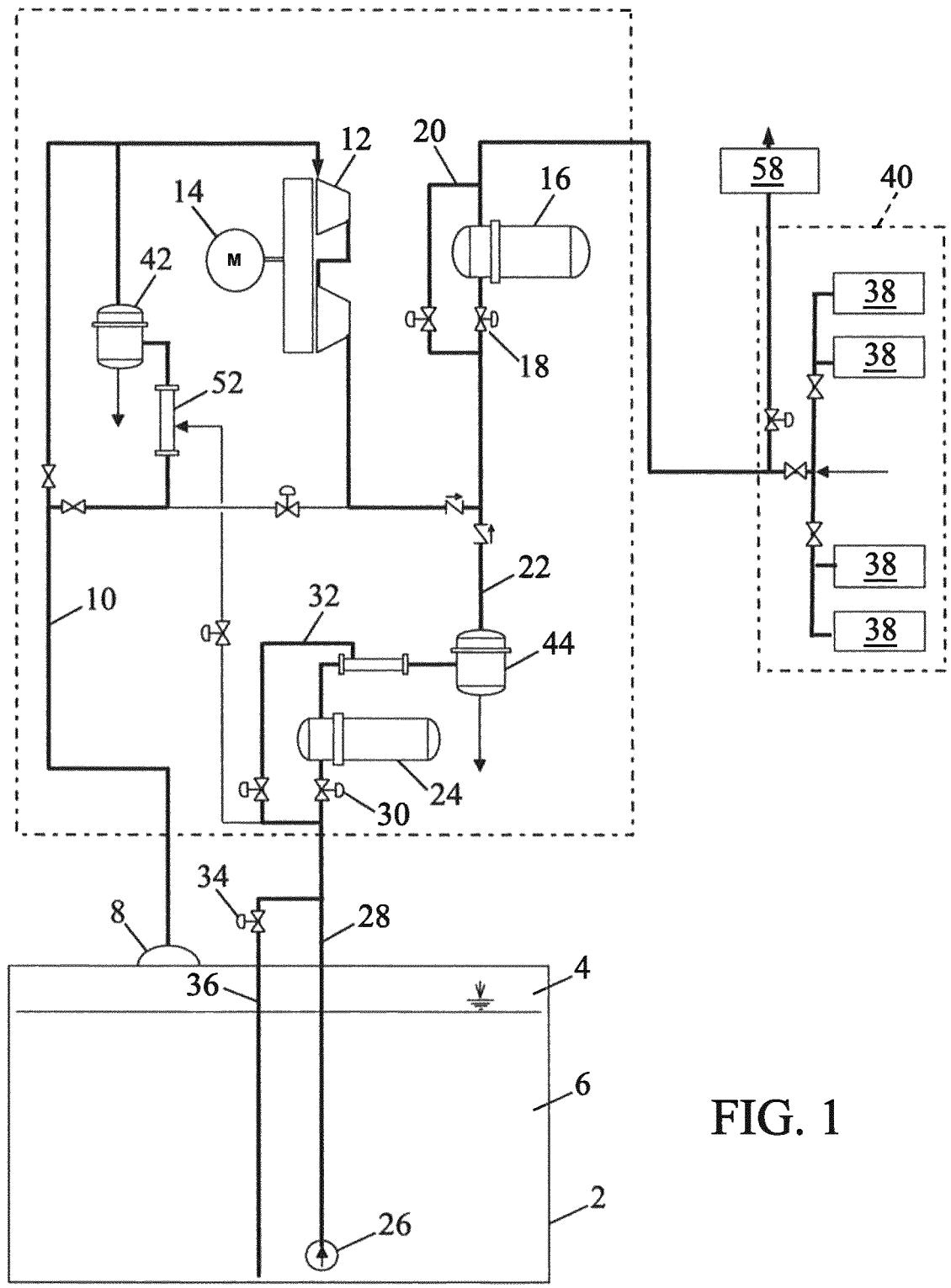
FIGS. 1 to 3 are generalised, schematic flow diagrams of different natural gas supply plants according to the invention.

Referring to FIG. 1 of the drawings, an LNG storage tank 2 (which may be one of a plurality) is located on board an ocean-going tanker (not shown). The tank 2 is insulated or has another form of thermal insulation associated therewith so as to keep down in flow of heat from the ambient environment into the liquid therein. The tank 2 has an ullage space 4 and contains a volume 6 of LNG. Since LNG boils at a temperature well below ambient, notwithstanding the thermal insulation of the tank 2, there is a continuous evaporation of the LNG into the ullage space 4. The resulting vaporised gas flows out of the tank 2 though an outlet 8 and passes along a pipeline 10 to a compressor (or blower) 12. The compressor 12 may be driven by an electric motor 14. The pressure of the gas is raised by operation of the compressor 12. The heat of compression is normally sufficient to raise the temperature of the gas being compressed to suitable temperatures being required for supplying engines such as 4-strokes low pressure Diesel engines. However, the resulting compressed gas therefore can pass through a gas heater 16 in which it may be heated by steam (or other heating medium, e.g. hot water) so as to adjust its temperature to the required temperature. To avoid overheating the gas, temperature control is provided by a valved by-pass line 20 extending from upstream to downstream of the gas heater 16. As a further measure of temperature control, the gas heater has on its upstream side a flow control valve 18 which is able to set so as to select the outlet temperature therefrom.

A second flow comes from the storage tank 2. This second flow is a flow of vaporised natural gas that is formed by employing a forcing vaporiser 24 to vaporise a flow of LNG taken by a submerged pump 26 from the volume 6 of LNG within the tank 2. The outlet of the pump 26 communicates with the forcing vaporiser 24 via a riser 28. A pressure control valve 34 opens a pipe 36 to allow liquid to be returned to the storage tank 2 for different flow rates through the vaporiser 24. The forcing vaporiser 24 has an enlarged superheating section to enable an outlet temperature of plus 20° C. to be readily achievable. The forcing vaporiser 24 has an arrangement of valves similar to that associated with the gas heater 16. Thus, there is a first flow control valve 30 on the upstream side of the vaporiser 24 to set the outlet pressure of the heater 16 so that it is equal to the outlet pressure of the compressor 12, and a valve by-pass line 32 extending from upstream to downstream of the vaporiser 24 to control the outlet temperature of the vapour. The vaporiser 24 is typically of a kind which employs steam heating to raise the temperature of the fluid flowing therethrough.

The second flow of gas is supplied into the first flow of gas (coming out from the storage tank by the pipeline 10) by a conduit 22 downstream the compressor 12 and upstream the heater 18.

The gas coming out from the gas heater 16 can be used for supplying dual fuel engines 38 which are located in an engine room 40 of the tanker.

The apparatus according to the invention preferably has various safety measures to cope with any unexpected operating conditions. For example, various valves are used by a way known from a person having ordinary skill in the art. Some valves are shown on the figures but are not described in this specification.

Under conditions when the Natural Boil-Off (NBO) is relatively warm, it may be necessary to lower the temperature. The NBO enters a spray precooler 52, where a small amount of LNG is mixed with the NBO to lower the temperature. This can result in droplets being carried downstream of the spray precooler 52. To avoid that the gas in the compressor 12 contains droplets of liquid, a phase separator vessel 42 in which the liquid disengages from the gas is located on pipeline 10. The liquid is returned via a conduit to a region of the storage tank 2 preferably below the liquid surface (in volume 6). This phase separator vessel concerns the Natural Boil-Off (NBO). A second phase separator vessel 44 is also foreseen for the Forced Boil-Off (FBO). The liquid may be withdrawn from the vessel 44 through a bottom outlet and is led by a conduit to the storage tank 2 (preferably in volume 6). The resulting natural gas, freed of particles of liquid, passes out of the top of the phase separator 44 and at a low or cryogenic temperature is mixed with the natural gas from the compressor 12 at a region upstream of the gas heater 16.

FIG. 1 (and also FIGS. 2 and 3) shows only main elements. Elements such as for example start-up line, interconnection with a second compressor, back-up vaporiser, second heater, etc. are not represented).

If desired, the phase separator 42 and/or 44 may be fitted at a region near its top with a pad of absorbent material or of wire mesh which may absorb any residual droplets of LNG from the gas in the phase separator. The liquid may be withdrawn from the vessel 42 and/or 44 through a bottom outlet continuously or at regular intervals and returned to the tank 2 by appropriate operation and control of a valve (not shown).

Figure 2:
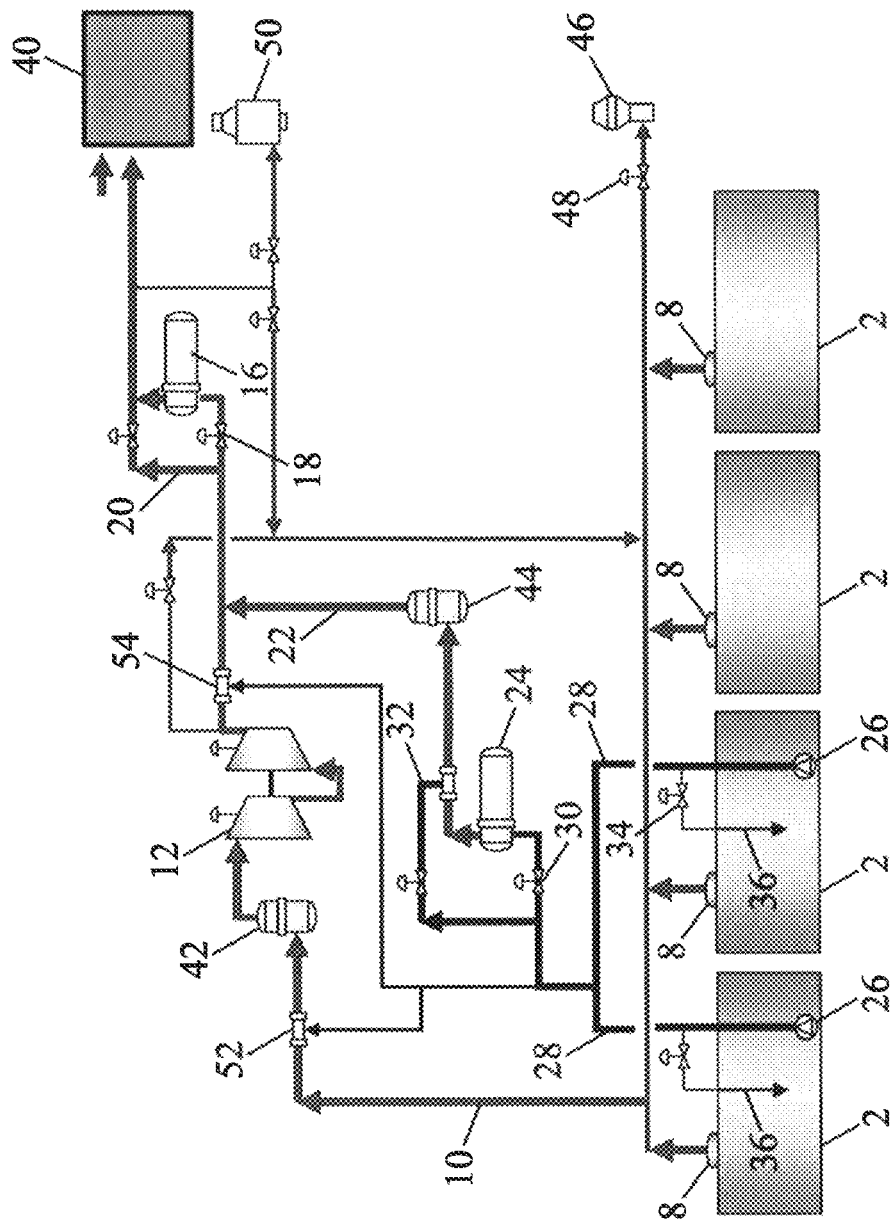

FIG. 2 is an embodiment of the invention with several storage tanks 2. This embodiment shows that the FBO is taken from some (1, 2 or eventually more) tanks. FIG. 2 shows also a vent mast 46 connected to the outlets 8 of the tanks 2 via a control valve 48. It also shows a Gas Combustion Unit (CGU) 50 in which gas can be burned.

The structure of the apparatus shown on FIG. 2 is the same than the structure of the apparatus of FIG. 1. On the first gas flow, in order to minimise the head (and therefore power) requirements of the compressor, the NBO is usually cooled during ballast voyage by means of a spray precooler 52 upstream of the compressor 12. The phase separator vessel 42 is an NBO mist separator and is installed between the spray precooler 52 and compressor 12, to protect the compressor from possible droplet carryover. Condensate is returned to tank 2 using a pressure-assisted drain pot (not shown). An after cooler 54 is provided in each of the lines to the dual fuel engines in the engine room 40 and the GCU 50, to provide any temperature corrections required.

On the second gas flow, a forcing vaporiser is provided to generate FBO to make up the fuel gas requirements if the NBO is insufficient. The liquid feed to the forcing vaporiser 24 is either by means of dedicated fuel gas pumps 26 are installed in 2 of the tanks, or spray pumps (not shown).

As the forced gas contains all the components of the LNG, the proportion of heavy hydrocarbons will have a negative influence on the methane number of the gas entering the engine. In order to improve the methane number under these circumstances, the forcing temperature is decreased and an FBO mist separator (second phase separator vessel 44) is installed after the forcing vaporiser 24 to remove condensate. This removes a large proportion of the heavy hydrocarbons, which are returned to the tanks 2.

The NBO and FBO streams are combined after the fuel gas compressor 12. The combined stream then passes through the fuel gas (low-duty) heater 16 before being routed to the engine(s) in the engine room 40.

The GCU 50 (or thermal oxidizer 56 shown in FIG. 1) is provided to dispose of excess NBO under low engine load conditions, where consumption is lower than NBO supply. It may also be used during compressor starting to dispose of gas while the inlet lines cool down.

Additional fuel gas is supplied by dedicated high-head fuel gas pumps and fed to the forcing vaporiser 24. The forced gas is sent to the FBO mist separator (phase separator vessel 44), where the heavy hydrocarbons are removed and returned to tank under system pressure.

Figure 3:
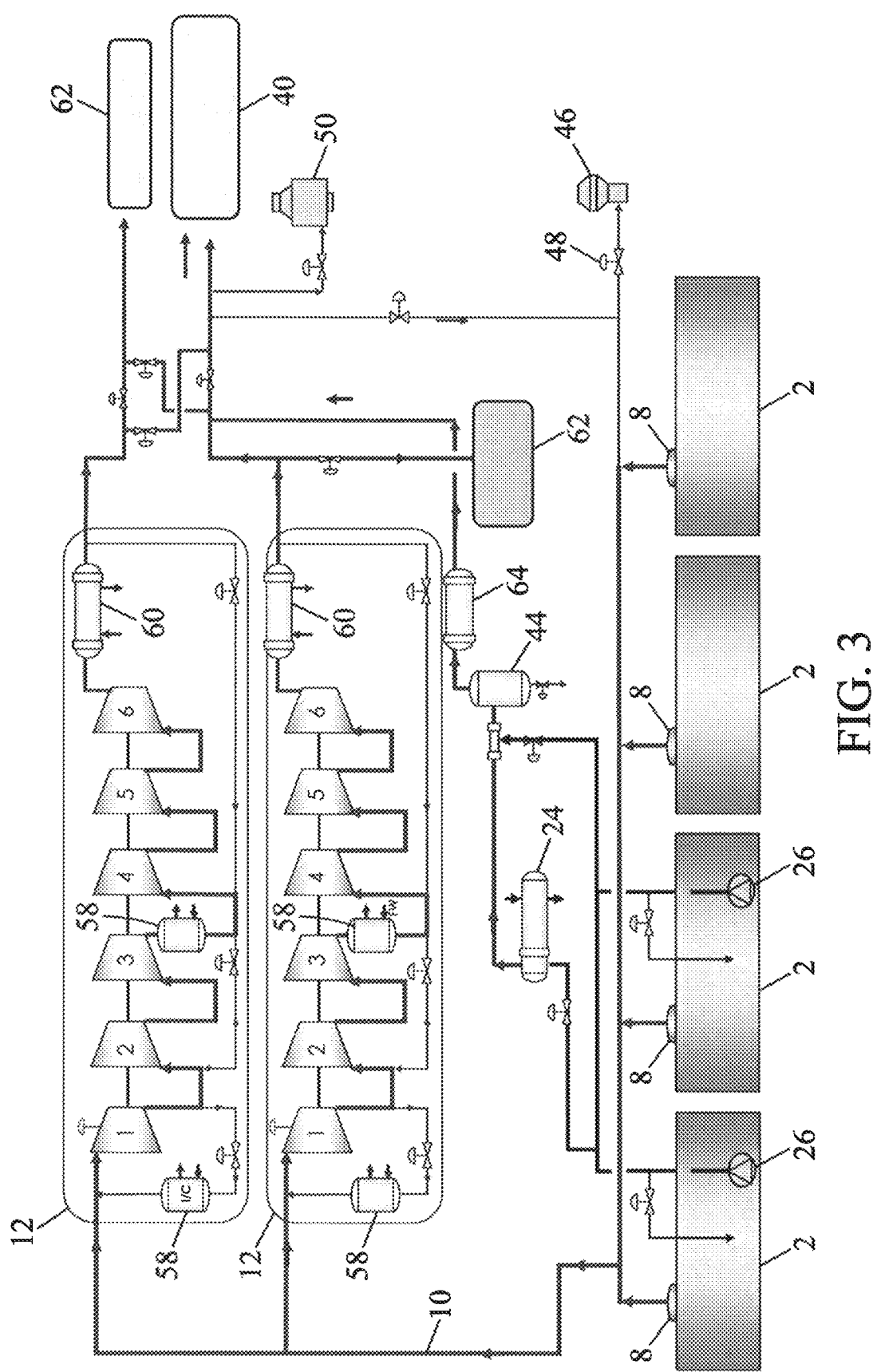

FIG. 3 shows another embodiment of a treatment apparatus of the disclosure. This embodiment proposes two compressors 12. Each compressor 12 has six stages and also comprises two intercoolers 58 and an after cooler 60. A first intercooler 58 is located in a loop joining the outlet of the first stage to its inlet. The second intercooler 58 is located in series between the third and the fourth stage of the considered compressor 12. The after cooler 60 is placed downstream of the sixth stage and allows adjusting the temperature of the compressed gas flow.

In this embodiment, it is possible to deliver two different pressures. This treatment apparatus can supply for example engines in an engine room 40 but also a generator 62 or another kind of consumer.

As can be seen, in this embodiment, there is no heater after the compressors 12. The FBO gas is mixed to the compressed NBO gas downstream the compressors 12 (in the represented embodiment, also downstream the after coolers 60), upstream the generator 62 and the engines of the engine room 40.

To adapt the state of the gas coming from the second flow (FBO) to the state of the compressed gas coming from the first flow (NBO), a heater 64 is also foreseen downstream of the phase separator vessel 44. The gas coming out from the heater 64 is then mixed to the NBO compressed gas. The pressure of the gas (NBO and FBO) is for example between 10 and 20 bar. If the compressors 12 deliver two different pressures, the FBO gas can be mixed to the gas coming from only one of the compressors 12 or a second line with FBO can be foreseen.

FIG. 3 shows also a reliquefaction plant 62. In case of surplus of NBO gas, the extra gas can be reliquefied and sent back to the tanks 2, thereby conserving the cargo.

The apparatus described here above fulfill the conditions required for optimum operation of the low pressure 2-stroke dual fuel engines extensively. This includes features which maximise the available efficiency of the engines, while maintaining conditions suitable for the operation of multi-stage compressors, heaters and vaporisers.

According to an advantageous embodiment of the apparatus according to this disclosure, the compressors have to be sized to a capacity suitable for natural boil-off gas. This allows a reduction in the capacity and the installed power. The proposed FBO conditioning improves the composition of the gas and allows wider operation range, which would otherwise be limited by the effects of a lower methane number.

The pressure created by the fuel gas pump is retained and used after the forcing vaporiser. This conserves the energy input from the pump, and reduces the compressor drive power considerably.

The correct control of the fuel gas supply system and ancillary equipment (spray pumps, GCU, etc.) will allow trouble-free, automatic operation, in all operating modes.

According to the disclosure, an economic Boil-Off Gas treatment system is proposed which offers considerably benefits for the complex fuel gas handling requirements of a low pressure 2-stroke dual fuel LNG carrier.

While the invention has been illustrated and described in details in the drawings and foregoing description, such illustration and description have to be considered as illustrative or exemplary and not restrictive; the invention is not limited to the disclosed embodiments. Variations to the disclosed embodiments can be understood and effected by those skilled in the art in practicing the claimed invention, from a study of the drawings, the disclosure, and the appended claims.

What is claimed is:

1. A method for treating natural gas coming from an LNG tank for supplying at least an engine, comprising:
supplying a first line with natural boil-off gas;
compressing the natural boil-off gas to form compressed natural boil-off gas;
supplying a second line with liquefied natural gas;
forcing vaporization of the liquefied natural gas to form forced boil-off gas;
mixing said compressed natural boil-off gas with said forced boil-off gas to form a mixed gas, said mixed gas having a pressure of 10 to 20 bar; and
supplying at least an engine with the mixed gas at a pressure of 10 to 20 bar;
wherein the engine comprises a 2-stroke dual fuel Diesel engine or a 4-stroke dual fuel Diesel engine,
wherein said compressing of the natural boil-off gas is performed in two multi-stage compressors operating in parallel to form a first portion of compressed natural boil-off gas and a second portion of compressed natural boil-off gas, and
wherein said first portion of compressed natural boil-off gas and said second portion of compressed natural boil-off gas are at different pressures.

2. The method of claim 1, wherein each of the two multi-stage compressors comprises six stages.

3. The method apparatus of claim 1, wherein the first line comprises at least an after cooler positioned downstream of the compressing the natural boil-off gas, and the second line comprises at least a heater positioned downstream of the forced vaporization.

4. The method of claim 1, further comprising cooling the compressed natural boil-off gas in the first line in an after cooler before mixing the compressed natural boil-off gas with the forced boil-off gas.

5. The method of claim 4, further comprising heating the forced boil-off gas after the forced vaporization and before mixing the compressed natural boil-off gas with the forced boil-off gas.

6. The method of claim 1, further comprising removing liquid after vaporization of the liquefied natural gas from fluid in the second line with a mist separation device.

7. The method of claim 1, further comprising, after the forced vaporization, heating the forced boil-off gas in the second line.

8. The method of claim 1, further comprising providing at least one storage tank containing a ullage space and a volume of liquefied natural gas, wherein said first line is in fluid communication with said ullage space and said second line is in fluid communication with said volume of liquefied natural gas.

9. The method according to claim 1, wherein, prior to said mixing, said forced boil-off gas is passed through a phase separator vessel wherein liquid disengages from the forced boil-off gas.

10. The method according to claim 1, wherein, prior to said mixing, said natural boil-off gas is passed through a phase separator vessel wherein liquid disengages from the natural boil-off gas.

11. The method of claim 1, further comprising heating the mixed gas prior to being supplied to said at least an engine.

12. The method of claim 1, further comprising cooling the natural boil-off gas in a spray precooler upstream of the compressor.

13. A method for treating natural gas coming from an LNG tank for supplying at least an engine, comprising:
- supplying a first line with natural boil-off gas;
- compressing the natural boil-off gas to form compressed natural boil-off gas;
- supplying a second line with liquefied natural gas;
- forcing vaporization of the liquefied natural gas to form forced boil-off gas;
- mixing said compressed natural boil-off gas with said forced boil-off gas to form a mixed gas; and
- supplying at least an engine with the mixed gas;
- wherein the engine comprises a 2-stroke dual fuel Diesel engine or a 4-stroke dual fuel Diesel engine,
- wherein said compressing of the natural boil-off gas is performed in two multi-stage compressors operating in parallel to form a first portion of compressed natural boil-off gas and a second portion of compressed natural boil-off gas, and
- wherein said first portion of compressed natural boil-off gas and said second portion of compressed natural boil-off gas are at different pressures.

\* \* \* \* \*